No. 702,071. Patented June 10, 1902.
N. PAULSEN.
CLEARING ATTACHMENT FOR HARROWS.
(Application filed Oct. 28, 1901.)

(No Model.)

Witnesses,

Inventor,
Nahmen Paulsen
By Dewey Strong & Co.
Attys

UNITED STATES PATENT OFFICE.

NAHMEN PAULSEN, OF JOLON, CALIFORNIA.

CLEARING ATTACHMENT FOR HARROWS.

SPECIFICATION forming part of Letters Patent No. 702,071, dated June 10, 1902.

Application filed October 28, 1901. Serial No. 80,293. (No model.)

*To all whom it may concern:*

Be it known that I, NAHMEN PAULSEN, a citizen of the United States, residing at Jolon, county of Monterey, State of California, have invented an Improvement in Clearing Attachments for Harrows; and I hereby declare the following to be a full, clear, and exact description of the same.

My invention relates to a device for raising harrow-sections to clear the teeth from the ground for the purpose of clearing them of weeds or other obstructions which may be entangled in the teeth, and it may also be used for raising the harrow so as to clear fixed obstructions in the ground, such as rocks or stones.

It consists of the parts and the constructions and combinations of parts hereinafter described and claimed.

Figure 1:
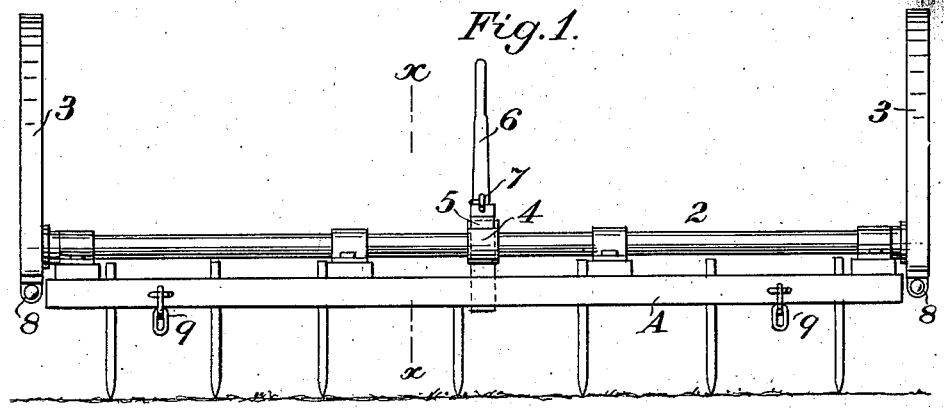
Figure 2:
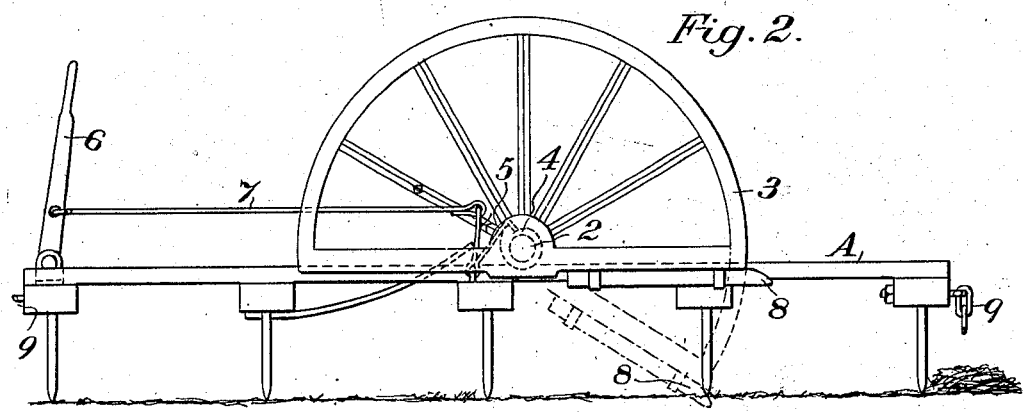
Figure 3:
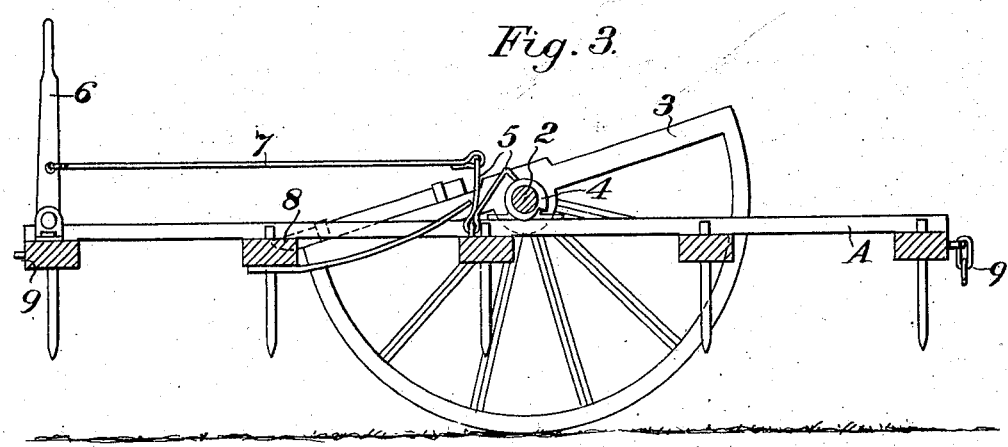

Figure 1 is a front elevation of my invention. Fig. 2 is a side elevation. Fig. 3 is a longitudinal section along the line $xx$ of Fig. 1, showing the harrow raised from the ground.

A is a harrow-frame which may be used singly, or there may be as many sections connected and used together as may be desired in the usual manner of operating harrows. Journaled across the harrow is a shaft 2, and upon the ends of the shaft are fixed segments 3, so as to be turnable with it. These segments are normally maintained in position above the shafts by any suitable latch or attachment. In the present case I have shown a cam or stop 4 fixed upon the shaft, and a spring-actuated latch 5 is carried upon the harrow in such a manner as to engage the cam or stop when the segments are turned upwardly and retain them in this position until released. The releasing device consists of any suitable connection by which the catch may be disengaged from the stop. In the present case I have shown a hand-lever 6, a rod 7 connecting it with the latch, so that the latter may be lifted to release the stop and allow the shaft to rotate until the segments engage the ground, when a further travel of the harrow will cause it to rise on account of the curvature of the segments, which serve to lift it up.

In order to insure the segments engaging with the ground when turned for that purpose, I have shown projecting spurs or points 8 fixed upon the front edges of the segments, and the latter are sufficiently heavier in front of the shaft, so that when released the segments will turn and the points tilt downward and engage the ground, thus holding the segments stationary and allowing the harrow to be lifted while they complete the circle which they form.

The segments may be of any desired length or shape. In the present case I have shown them as being half-circles, and these will ordinarily hold the harrow-section up long enough to clear off any weeds or obstructions from the teeth or to allow it to pass over any fixed obstruction not higher than the distance to which the harrow can be lifted. As soon as the half-circle of rotation is completed the harrow will be allowed to drop upon the ground and the segments will have turned so far that the weighted portion has passed the vertical line through the axis, so that when the rear ends of the segments are disengaged from the ground they will immediately turn to their normal position, where they will be arrested by the stop and catch previously described.

In order to insure the proper lifting of the harrow-section, it is preferable to so journal the shaft that there is a greater weight of harrow behind its points of engagement with the ground than there is in front, and this causes the front portion of the harrow to lift first, the other portion following as the weight bears upon the segments.

Any usual or suitable attachments for hauling the harrow or of connecting sections together may be employed, as shown at 9.

Having thus described my invention, what I claim, and desire to secure by Letters Patent, is—

1. The combination with a harrow, of revoluble segments thereon and means for normally retaining them out of contact with the ground, said segments being weighted forward of their axis of rotation, whereby they are turned to come in contact with the ground when released.

2. The combination with a harrow of a shaft journaled thereon, segments fixed to the ends of the shaft and means weighting the segments forward of the shaft, means including a stop on the shaft and a spring-pressed member engaging the stop, for normally retaining the segments out of contact with the ground, and means for withdrawing the spring-pressed member from its engagement with the stop.

3. The combination with a harrow of a shaft journaled thereon, segments fixed to the shaft, means on the segments weighting them forward of the shaft, means normally retaining the segments out of contact with the ground, and means for releasing the segments to allow the weights to operate to bring the segments in contact with the ground.

4. The combination in a harrow of a single shaft journaled thereon and having a stop fixed to the shaft between its ends and a spring-pressed member on a rigid part of the harrow and adapted to engage said stop to normally retain the segments out of contact with the ground, and means for withdrawing the spring-pressed member out of engagement with the stop to allow the shaft to rotate and the segments to engage with the ground, said spring-pressed member automatically engaging the stop and locking the segments in normal position when the latter have completed their revoluble movement.

5. The combination with a harrow of a shaft journaled transversely thereon, segments fixed and revoluble with the shaft, a catch carried by the shaft and a latch carried by the harrow and engaging the catch to normally retain the segments with the convex side upward, weights carried by the segments forward of the shaft whereby they are turned to come in contact with the ground when released.

6. The combination with a harrow of a shaft journaled transversely thereon, segments fixed and revoluble with the shaft, a catch carried by the shaft and a latch carried by the harrow and engaging the catch to normally retain the segments with the convex side upward, weights carried by the segments forward of the shaft whereby they are turned to come in contact with the ground when released, and spurs or points projecting from the segments to engage the ground and cause the segments to turn.

In witness whereof I have hereunto set my hand.

NAHMEN PAULSEN.

Witnesses:
J. A. TRESCONY,
E. C. GRISWOLD.